United States Patent [19]

Spiegel et al.

[11] Patent Number: 5,588,504
[45] Date of Patent: Dec. 31, 1996

[54] PROCESS AND ARRANGEMENT FOR SUPPLYING LUBRICANT TO A RECIPROCATING PISTON ENGINE

[75] Inventors: Leo Spiegel; Franz Pischinger, both of Aachen, Germany

[73] Assignee: FEV Motorentechnik GmbH & Co., Aachen, Germany

[21] Appl. No.: 403,746

[22] PCT Filed: Jul. 11, 1994

[86] PCT No.: PCT/EP94/02262

§ 371 Date: Jun. 1, 1995

§ 102(e) Date: Jun. 1, 1995

[87] PCT Pub. No.: WO95/02753

PCT Pub. Date: Jan. 26, 1995

[30] Foreign Application Priority Data

Jul. 12, 1993 [DE] Germany .................. 43 23 262.0

[51] Int. Cl.$^6$ .................................. F01M 1/00
[52] U.S. Cl. .................. 184/6.8; 184/6.5; 184/6.26; 184/55.1; 123/196 R
[58] Field of Search .............. 184/6.5, 6.8, 6.9, 184/6.26, 55.1; 123/196 R; 92/154, 158

[56] References Cited

U.S. PATENT DOCUMENTS

| | | | |
|---|---|---|---|
| 1,090,991 | 6/1906 | Knight | 184/6.26 |
| 1,967,251 | 7/1934 | McFerren | |
| 2,438,816 | 3/1948 | Moore | 123/196 R |
| 2,781,632 | 2/1957 | Meijer | 184/6.26 |
| 4,313,368 | 2/1982 | Promeyrat | 92/158 |
| 5,190,121 | 3/1993 | Muzyk | 184/6.5 |

FOREIGN PATENT DOCUMENTS

| | | |
|---|---|---|
| 0003439 | 8/1979 | European Pat. Off. . |
| 675371 | 2/1930 | France . |
| 2531747 | 2/1984 | France . |
| 355070 | 6/1922 | Germany . |
| 4039169 | 7/1992 | Germany . |
| 0197708 | 9/1986 | Japan ............... 184/6.26 |
| 1277612 | 11/1989 | Japan . |
| 0277612 | 11/1989 | Japan ............... 184/6.26 |

*Primary Examiner*—Thomas E. Denion
*Attorney, Agent, or Firm*—Spencer & Frank

[57] ABSTRACT

A process and an assembly for supplying a liquid lubricant to points of a reciprocating piston engine which are to be lubricated and which include at least running surfaces of a piston-cylinder tube unit of the reciprocating piston engine. The reciprocating piston engine has a piston and a cylinder. According to the process, the lubricant in at least one conditioning device is united with a gaseous transport medium. In the conditioning device, a lubricating mixture is formed including small liquid particles of lubricant carried by the gaseous transport medium. At least one of the lubricating mixture and the lubricant is passed with the gaseous transport medium through a plurality of supply ducts corresponding to the points to be lubricated. The gaseous transport medium and excess lubricant are drawn away through at least one drain disposed in a region of the points to be lubricated.

23 Claims, 13 Drawing Sheets

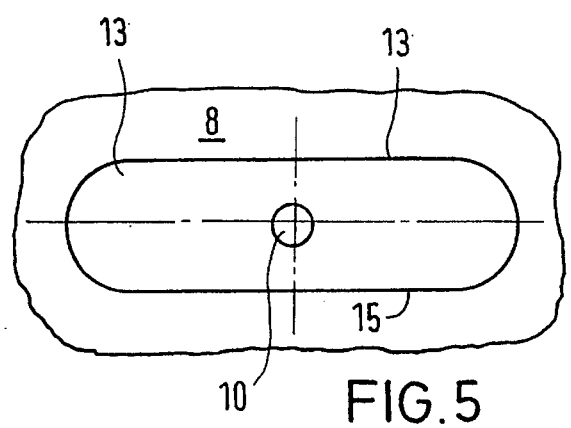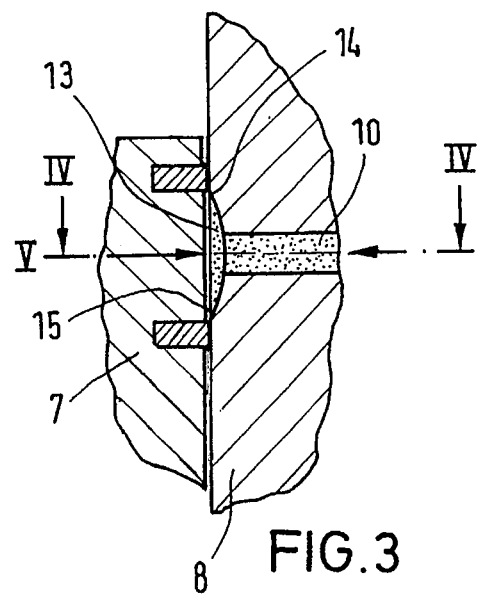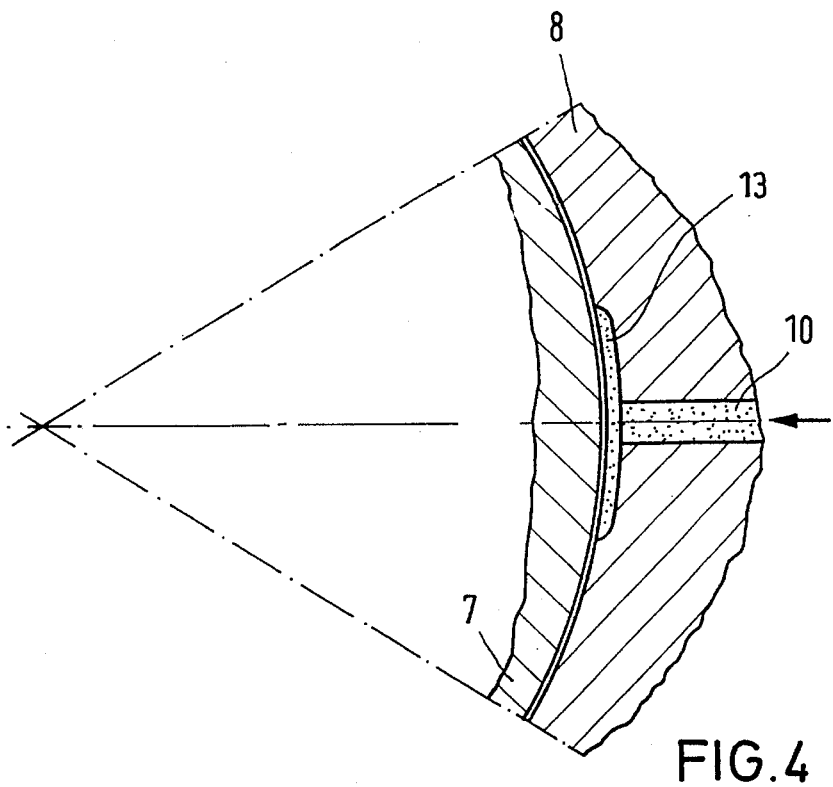

PROCESS AND ARRANGEMENT FOR SUPPLYING LUBRICANT TO A RECIPROCATING PISTON ENGINE

FIELD OF THE INVENTION

The invention relates to a process and arrangement for supplying a liquid lubricant to the points to be lubricated of a reciprocating piston engine, in particular the running surfaces of the piston/cylinder tube unit. In particular, the invention relates to supplying lubricant to internal combustion engines, so that while reciprocating piston engines will be predominantly discussed hereinafter, this in no way restricts the invention.

BACKGROUND OF THE INVENTION

Lubricating the points to be lubricated in a reciprocating piston engine, for instance a four-stroke engine, is done as a rule by pressure-recirculation lubrication, in which the lubricating oil is carried from a reservoir to the various points to be lubricated via a pump and distribution lines. The bearings between the connecting rod and the crankshaft on the one hand and between the crankshaft and the engine block on the other are supplied with lubricating oil via corresponding bores in the crankshaft and crankcase, while the lubrication of the piston/cylinder tube units is done through the injection oil present in the crankcase. Lubricating the piston/cylinder tube unit by means of injection oil has the disadvantage that as a rule substantially more lubricating oil than necessary is delivered to the point to be lubricated. Oil stripper rings must therefore be provided, which increase the friction between the cylinder and the cylinder tube and thus lower the efficiency of the engine.

In two-stroke internal combustion engines, besides pressure-recirculation lubrication with external scavenging processes, mixture lubrication, especially with crankcase scavenging, is employed. In this lubrication system, the lubricating oil is exposed to the fuel. Together with the fuel, the lubrication oil is atomized and reaches the points to be lubricated along with the air aspirated by the engine. One disadvantage of this lubricating system is that the lubricant can be delivered to the various points to be lubricated only in an uncontrolled fashion. There is also the disadvantage that by far the majority of the lubricant exposed to the fuel is expelled again, via the combustion chamber of the engine, without contributing to lubricating the points to be lubricated. Hence this lubrication system requires increased consumption of lubricant and results in major environmental pollution.

It is also known in two-stroke internal combustion engines to deliver the lubricating oil as a function of engine load and/or engine speed. In this so-called separate lubricating system, the delivery of oil, depending on the engine model, is made to the fuel, to the aspirated air, or directly to the points to be lubricated via liquid pressure oil. With this lubricating system, accurate dosing of the delivered quantity of lubricating oil is impossible, or can be done only with major effort. It is therefore known to deliver the lubricating oil to the point to be lubricated in increments, or in other words at time intervals. That has the disadvantage, however, that good lubricating action or even excess lubrication is attained only after the delivery of lubricant, and by the next time lubricant is delivered the lubrication decreases sharply. Since very slight quantities of lubricant are often all that is necessary, it is impossible with this lubricating system to achieve a precisely dosed delivery of lubricant.

One process for targeted delivery of lubricant in a two-stroke internal combustion engine is known from H. W. Bönsch, *Der schnell laufende Zweitakt-Motor* [The High-Speed Two-Stroke Engine] Motor Buch Verlag 1982, page 140, in which each piston/cylinder tube unit is supplied by means of pressure oil via a bore. The crankshaft bearing for each cylinder is likewise lubricated via pressure oil. Another process of supplying lubricant to crankshaft bearings is disclosed in SAE Paper 85157, published in 1985. In this process, the lubricant is drawn into the respective bearings by negative pressure via riser lines. For the sake of assuring reliable lubrication provision is also made to blow air into the riser line by means of the excess pressure in the piston housing. In this process, precise dosing of the quantities of lubricant needed at the various points to be lubricated is not possible.

The object of the invention is to create a process for supplying the points to be lubricated in a reciprocating piston engine, with which an at least approximately exactly dosed, targeted delivery of lubricant is possible.

SUMMARY OF THE INVENTION

The object of the invention is obtained in accordance with the invention in that the lubricant is united in at least one conditioning device with a gaseous transport medium, forming a lubricating mixture; the lubricating mixture is passed through supply ducts into the region of the point to be lubricated; and the lubricant is applied to the surfaces to be lubricated in the form of small liquid particles. This has the advantage that the lubricant is present, at least in the region of the point to be lubricated, finely and uniformly distributed in the transport medium, forming a lubricant mist or aerosol that uniformly moistens the point to be lubricated. The transport of lubricant can take place via supply lines and/or supply bores embodied as thin tubes. The transport of lubricant into these supply ducts can also be in the form of a wall film, and the atomization is effected for instance by a cross-sectional constriction of the supply duct in the immediate vicinity of the point to be lubricated.

Using this kind of lubricant mixture also has the advantage that it is easy to deliver and to dose. It also avoids plugging up of the supply ducts from contaminants in the lubricant. In particular, it is even possible to deliver merely slight quantities of lubricant that are needed for the lubricating action, in a simple way. Another advantage is that this lubricant mixture can also reach regions of the point to be lubricated that are located farther away from the outlet opening of the supply duct.

In accordance with one embodiment of the invention, it is provided that the lubricant mixture is split into partial streams, and that the various doses for the various points to be lubricated are effected by means of suitable flow resistances in the various supply ducts for the partial streams. It may also be provided that the lubricant and the transport medium each be mixed in a plurality of conditioning devices, in accordance with the needs of the points to be lubricated that are each connected to the respective conditioning devices. As a result, individual dosing of the various points to be lubricated can be attained.

The delivery of lubricant mixture to the points to be lubricated is suitably effected continuously. It may be provided in this respect that the dosing is effected by varying the volumetric flow of transport medium and/or the concentration of lubricant in the transport medium. However, it may also be provided that the dosing is effected by intermittent interruption of the volumetric flow of the transport medium and/or of the volumetric flow of the lubricant stream. Overall, it is practical that the dosing is effected as a function of the load and/or rpm of the reciprocating piston engine.

A special problem in lubricating reciprocating piston engines is lubricating the running surfaces of the piston/cylinder tube unit. To supply this point to be lubricated, the invention provides that the lubricant mixture is carried through at least one supply bore in the cylinder wall into the interstice between the outer surface of the piston and the inner surface of the cylinder wall, and the supply bore discharges into the interstice, in the bottom dead center position of the piston, below the uppermost piston ring. This assures that the lubricant mixture for the most part bathes the piston, and the lubricant for the most part moistens this region of the outer surface of the piston and the inner surface of the cylinder wall. As a result, it can advantageously be assured that even if an only slight quantity of lubricant is used, adequate lubricating action is attained. The gaseous transport medium can flow out through the gap between the piston and the cylinder wall into the crankcase in the course of the upward motion of the piston.

To avoid misunderstanding, it is noted here that the lubricant mixture naturally varies its composition in the course of delivery and distribution. It is also understood that the gaseous transport medium drawn away or draining away may still be laden with lubricants. The term lubricant mixture is therefore employed hereinafter for a volumetric flow flowing to the points to be lubricated or the regions thereof, while the term gaseous transport medium predominantly means the volumetric flow leaving the point to be lubricated.

For uniform distribution of the lubricant on the surface of the piston or the cylinder wall, a plurality of such supply bores may be disposed along the circumference of the cylinder tube. It may also be practical for the cylinder wall to have at least one bore for draining away the gaseous transport medium and/or for excess lubricant. This is especially practical if the supply bore discharges in a region of the cylinder wall that is located between two piston rings, in the bottom dead center position of the piston. As a result, a satisfactory drainage of the gaseous transport medium can be effected. The bore for removing the gaseous transport medium may be located in the immediate vicinity of the supply bore, or for instance opposite the some. In the latter case in particular, adequate bathing of the piston is assured. It is practical in this respect that the outflow cross section is larger than the inflow cross section.

To improve the distribution of the lubricant mixture in the interstice between the piston and the cylinder wall, it may be provided that the mouth of the supply or drainage bore into the interstice be widened to form a groove. A groove may also be made in the piston, and it preferably cooperates, at bottom dead center of the piston, with the mouth of the supply bore in the cylinder wall. The grooves disposed on the outer surface of the piston and/or cylinder wall may by way of example extend over at least a portion of the circumference of the piston or cylinder wall, respectively. It is also possible for the grooves to extend parallel to the piston axis. Moreover, the grooves disposed on the outer surface of the piston or cylinder wall may be embodied in the form of a V or an X, for instance. The angle of inclination of the groove axes relative to the cylinder axis may be 45°, for instance. The advantage of this kind of groove arrangement is that the piston ring enters the groove and leaves the groove at selected points. Such a groove also extends not as far in the circumferential direction as a horizontal groove would, so that the piston ring is unable to plunge far into the groove. As a result, wear can be reduced considerably.

By providing such grooves, the outflow cross section for the gaseous transport medium can be enlarged, and an increased delivery of lubricant mist can be made possible. It may be advantageous if the grooves are embodied as approximately wedge-shaped in cross section, which promotes the development of a hydrodynamic lubricant film in the region of the transition from the widened portion to the cylinder tube wall. It also has the effect that the lubricant particles can be carried into the gap to be lubricated along with the outflowing transport medium.

For improved distribution of the lubricant mixture it may be provided that a plurality of such supply bores and/or drainage bores are disposed along the circumference of the cylinder wall, with suitable groove geometries. In a feature of the invention, it is also possible for the bore to discharge into an encompassing groove of the cylinder wall which at bottom dead center of the piston is located below the lowermost piston ring. It may also be practical if the bore cooperates with at least one partially encompassing groove on the outer surface of the piston. As a result of these provisions, distribution of the lubricant to the appropriate surfaces in a way that is uniform and adapted to requirements can be accomplished. It may be practical in this respect for the groove to extend helically over the surface of the piston. One end of the groove may then terminate in the upper region of the piston in an encompassing groove, while the other end is open in the direction of the crankcase. This assures an unhindered outflow of the gaseous transport medium. It may also be practical to provide a plurality of such grooves on the outer surface of the piston.

In another practical feature of the invention it is provided that the lubricant mixture is supplied to the upper connecting rod bearing through at least one bore in the piston, which bore cooperates with the supply bore in the cylinder wall. Thus in an advantageous way, a targeted and dosed lubrication of the upper connecting rod bearing, which by way of example has a roller bearing, can be accomplished. The bore in the piston may cooperate either directly with the supply bore or indirectly with the supply bore, via grooves disposed in the cylinder wall or via the grooves on the outer surface of the piston. It may be provided that for supplying lubricant to the upper connecting rod bearing, the grooves on the piston surface terminate on one end at the piston pin boss. The other end of each groove terminates on the outer surface of the piston, to prevent any possible outflow of lubricant mixture to the crankcase. As a result, a lubricant-containing atmosphere is established in the piston pin, which by way of example is drilled to make it hollow. Through suitable radial bores in the piston pin, the lubricant mixture can flow out via the upper connecting rod bearing, which assures the supply of lubricant to the bearing. In this respect it may be practical for the grooves to be disposed helically on the surface of the piston, with one end of each discharging into a radial bore that communicates with the connecting rod bearing, while the other end terminates on the piston surface, so that an adequate supply of lubricant to the upper connecting rod bearing is assured.

It is naturally also possible that with the above process the other points to be lubricated in a reciprocating piston engine can also be supplied with lubricant such as the bearings of the crankshaft in the crankcase. The lubrication of the bearings of the connecting rods on the crankshaft can take place through corresponding bores in the crankshaft. It may also be provided that the lubricant be carried through a corresponding bore in the connecting rod bearing on the crankshaft and a corresponding bore in the connecting rod to the upper connecting rod bearing.

It may be practical for the lubricant mixture to be delivered to the various points to be lubricated under pressure. An external compressor may be provided for that purpose. The excess pressure prevailing in the crankcase or in the work chamber of the reciprocating piston engine may also be utilized for that purpose. The gaseous transport medium and/or the excess lubricant is suitably drained away from the point to be lubricated by the application of a negative pressure to the corresponding drainage bores. In this course of the process, namely supplying the lubricant-containing transport medium under pressure on the one hand and drawing off the gaseous transport medium, optionally with excess lubricant, by means of negative pressure on the other, it is possible to supply roller bearings, for instance, with lubricant adequately and in targeted fashion.

This process can especially advantageously be used to supply two-stroke engines, since the requisite consumption of lubricant can thus be reduced considerably. It can also be practical, for assuring the functional reliability of the lubricating system at low temperatures, to heat the lubricant and/or the gaseous transport medium inside the lubricant conditioning device and/or the transport lines. In continuous operation, it may also be practical to cool the volumetric flow of transport medium or lubricant.

BRIEF DESCRIPTION OF THE DRAWING

The invention will now be described in detail, in conjunction with the drawing. Shown are:

FIG. 3, in section, another embodiment of the lubricant supply;

FIG. 4, a section taken along the line IV—IV of FIG. 3;

FIG. 5, the view in the direction of the arrow V of FIG. 3, but without a piston;

DETAILED DESCRIPTION OF THE INVENTION

Figure 1:
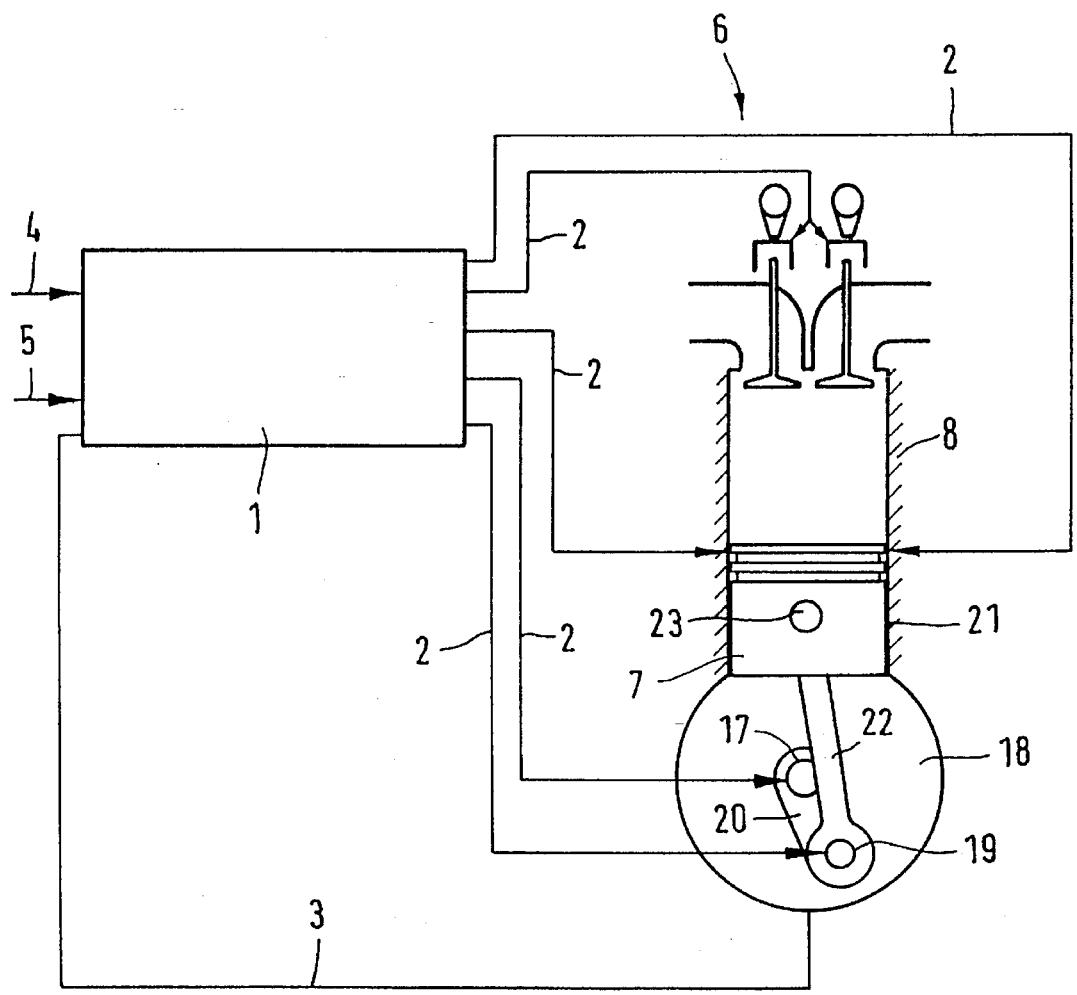
FIG. 1, a schematic illustration of a reciprocating piston engine with lubricant supply in accordance with the invention.

The lubricating process shown schematically in FIG. 1 for use with reciprocating piston engines has a conditioning device 1 for the lubricant mixture, transport lines 2 to the points to be lubricated in the reciprocating piston engine 6, and a line 3 for returning unused lubricant. The conditioning device 1 is provided with one connection 4, 5 each for the gaseous transport medium and for the liquid lubricant, respectively, and one connection for the return line 3. Furnishing of the gaseous transport medium, such as air, is done through an external compressor, not shown in the drawing, or by compressing in the crankcase or in the work chamber of the reciprocating piston engine. The liquid lubricant can for instance be drawn from a reservoir, not shown in the drawing.

In the conditioning device 1, the liquid lubricant is combined with the gaseous transport medium, forming a lubricant mixture. Provision may also be made so that the returned lubricant will be cleaned and optionally added to the gaseous transport medium with the addition of fresh lubricant. The lubricant mixture passes through the transport lines 2, which are preferably embodied as thin tubes and/or thin bores, to reach the various points to be lubricated.

The transporting of the liquid lubricant by means of the gaseous transport medium may be done by various mechanisms. One possible transport mechanism is atomizing the lubricant into small droplets, which are carried where they are needed by the gaseous transport medium. The droplets have a size on the order of magnitude of approximately 1 μm. In this transport mechanism, it must be assured, by embodying the end of the transport lines and/or bores toward the lubricant point in a special way, that the droplets will be deposited on the points to be lubricated. This can be done for instance by increasing the flow speed via a cross-sectional constriction and by an ensuing deflection of the stream to assure that the heavier lubricant droplets will be deposited on the surface to be lubricated. Another option for causing the deposition of the lubricant particles is to make a cross-sectional constriction, immediately upstream of the point to be lubricated, in the form of a porous body, for instance of gas-permeable ceramic; inside this cross-sectional constriction, major flow deflections result, leading to a growth in droplet size. These larger droplets can be deposited without difficulty at the point to be lubricated, because of their inertia.

Figure 11:
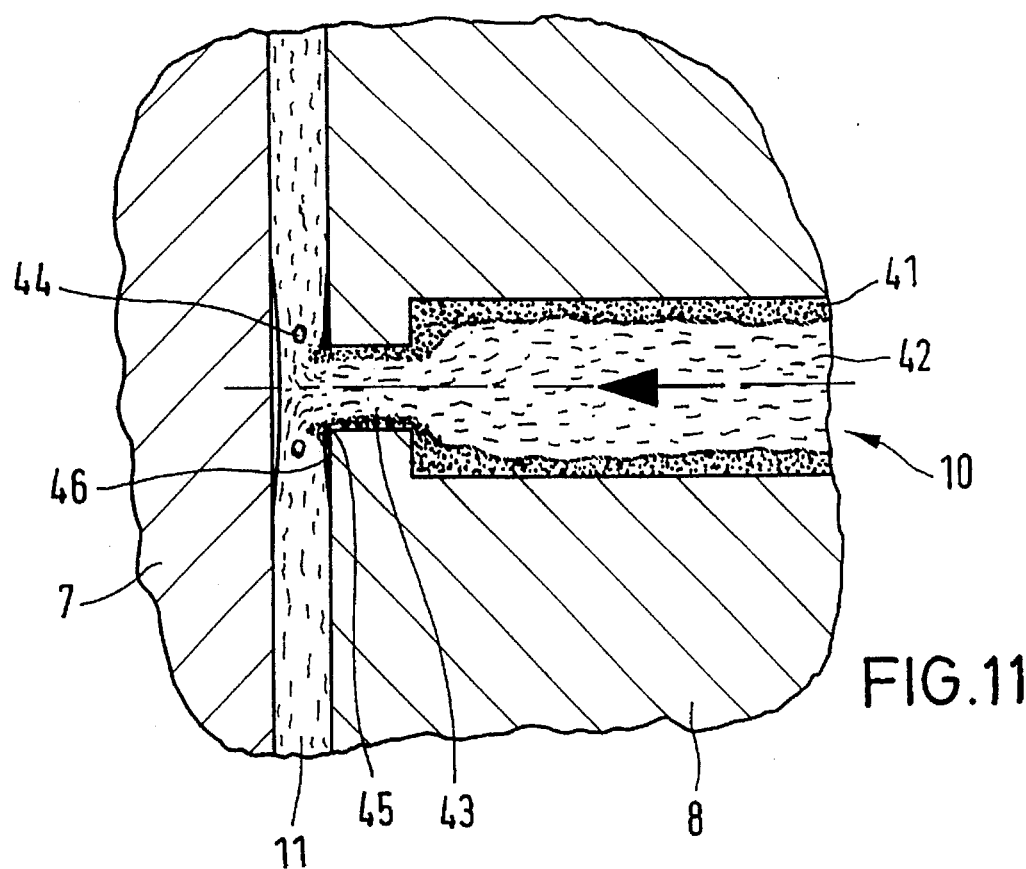
FIG. 11, the lubricant supply in the form of wall film transport.

In another transport mechanism, shown in FIG. 11, inside the transport lines 2 a wall film 41 of lubricant is formed, which is entrained by the gaseous transport medium 42 flowing through the lines. The atomization of the liquid wall film into droplets takes place here by means of a cross-sectional constriction 43 immediately upstream of or in the immediate vicinity of the point to be lubricated. Droplets 44 because of their size and inertia can deposit on the surface to be lubricated. By suitably embodying the end 45 of the cross-sectional constriction toward the inner surface 26 of the cylinder wall 8, for instance by rounding it off, the development of a wall film 46 of lubricant on the wall on the supply side of the point to be lubricated can be attained.

In the exemplary embodiment shown in FIG. 1, the points to be lubricated in the reciprocating piston engine are supplied with the lubricant mixture by means of a single conditioning device 1. Since as a rule the various points to be lubricated have different requirements in terms of lubricants, it may be suitable for the various transport lines to have different flow resistances or different, calibrated outlet openings and/or bores so that the total volumetric flow can be split up as needed, and so that every point to be lubricated can be supplied with the particular amount of lubricant it needs. Moreover, it is also possible for a plurality of conditioning devices to be provided, each of which supplies certain points to be lubricated in the reciprocating piston engine.

In the reciprocating piston engine 6, lubricant must be supplied in particular to the main crankshaft bearings 17, the crankshaft connecting rod bearings 19 and the running surfaces of the piston/cylinder tube unit 21, as well as the upper connecting rod bearing 23 in the piston 7. The supply to the main crankshaft bearings 17 may be done via transport lines and corresponding bores in the engine block 18. The crankshaft connecting rod bearings 19 can be supplied with lubricant via suitable bores inside the crankshaft 20.

Figure 2:
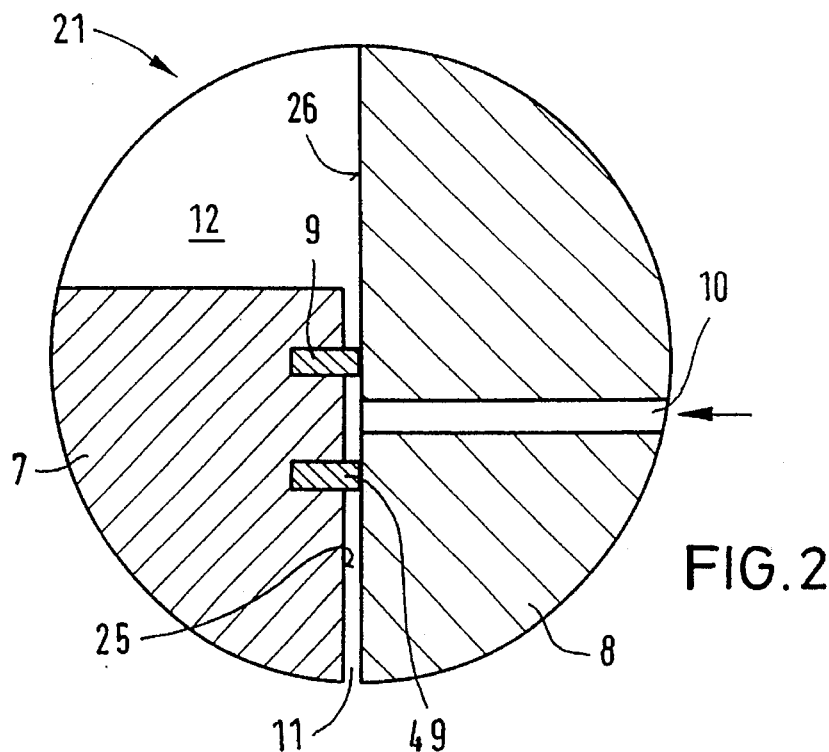
FIG. 2, in section and on a larger scale, the lubricant supply in the interstice between the cylinder wall and a piston of a cylinder/cylinder tube unit.

FIG. 2 shows one possibility of supplying lubricant to the piston/cylinder tube unit 21. The cylinder wall 8 has one or more supply bores 10, distributed over its circumference, which that discharge into the interstice 11 between the piston 7 and the cylinder wall 8. Advantageously, these bores 10 are disposed in a region of the cylinder wall that is always covered by the piston 7 during its reciprocating motion. To avoid losses of lubricant to the combustion chamber 12, the bores 10 are arranged such that in the bottom dead center position of the piston 7, they are located below the uppermost piston ring 9. This piston position is shown in FIG. 2. The lubricant mixture flows via the bore 10 into the gap (11) between the piston 7 and the cylinder wall 8 and bathes the entire piston. In the process, the droplets of lubricant will deposit on the outer surface 25 of the piston 7 and the inner surface (26) of the cylinder wall 8 and form the lubricant film required for lubricating the running surfaces. The gaseous transport medium can then flow out via the gap 11 between the piston 7 and the cylinder wall 8. For that purpose it may be suitable to provide a groove in the cylinder wall 8, in order to circumvent the lower piston rings 49.

In general the piston 7 has a plurality of piston rings, which rest sealingly on the cylinder wall 8. To assure adequate bathing of the piston including in the region of the piston rings, it may be practical for the cylinder wall, in the region of the supply bores, likewise to have bores for the outflow of the gaseous transport medium. This assures that the gaseous transport medium can flow out even if it is carried into the annular space defined by the piston rings. Enough lubricant is then entrained, and in this region can be deposited on the outer surface 25 of the piston 7 and the inner surface 26 of the cylinder wall 8, so that the film of lubricant required for the lubrication can be built up there. The cross section of the outflow bores should be larger than the cross section of the supply bores.

FIGS. 3–5 show another embodiment for supplying the lubricant-containing transport medium to the interstice 11 of the piston/cylinder tube unit 21. Here the supply bore 10 discharges into a groove 13 that extends at least partway over the circumference of the cylinder wall 8. By this means, the outflow cross section for the gaseous transport medium can be enlarged. The cross section of the groove is preferably approximately wedge-shaped, which reinforces the buildup of a hydrodynamic lubricant film on the top 14 or underside 15 of the groove as a function of the piston motion. In the exemplary embodiment shown in FIGS. 3–5, the groove 13 is oriented transversely to the piston motion, and in the circumferential direction of the cylinder wall 8 it has an essentially oval shape. As needed, it may be appropriate for the groove to extend at least partly parallel to the piston motion.

The groove 13 shown in FIG. 3 may also extend over the entire circumference of the cylinder wall 8. It is then practical for a plurality of supply bores 10 to be provided. In this embodiment with an encompassing groove, care must be taken that in the bottom dead center position of the piston 7, the groove is located below the lowermost piston ring. It may also be practical for one or more bores to discharge into the encompassing groove, in order to carry away the gaseous transport medium.

In principle, in internal combustion engines and in particular four-stroke engines, the supply bores 10 can discharge at arbitrary points of the circumference into the cylinder wall below the uppermost piston ring 9 in the bottom dead center position of the piston 7. It is practical to dispose them in the load-bearing zones, or in other words on the compression side and counterpressure side of the piston 7. In two-stroke internal combustion engines with inlet and outlet slits, it is practical to dispose the supply bores 10 in the circumferential direction between the inlet and the outlet slit of the combustion chamber and below the uppermost piston ring 9 in the bottom dead center position of the piston. In the bottom dead center position of the piston 7, the supply bore 10 is suitably located as directly as possible beneath the uppermost piston ring 9, so that the largest possible portion of the outer piston surface 25 will be supplied with lubricant in the course of the upward motion of the piston 7. Moreover, a plurality of supply bores may also be provided, spaced apart from one another parallel to the cylinder axis.

Figure 6:
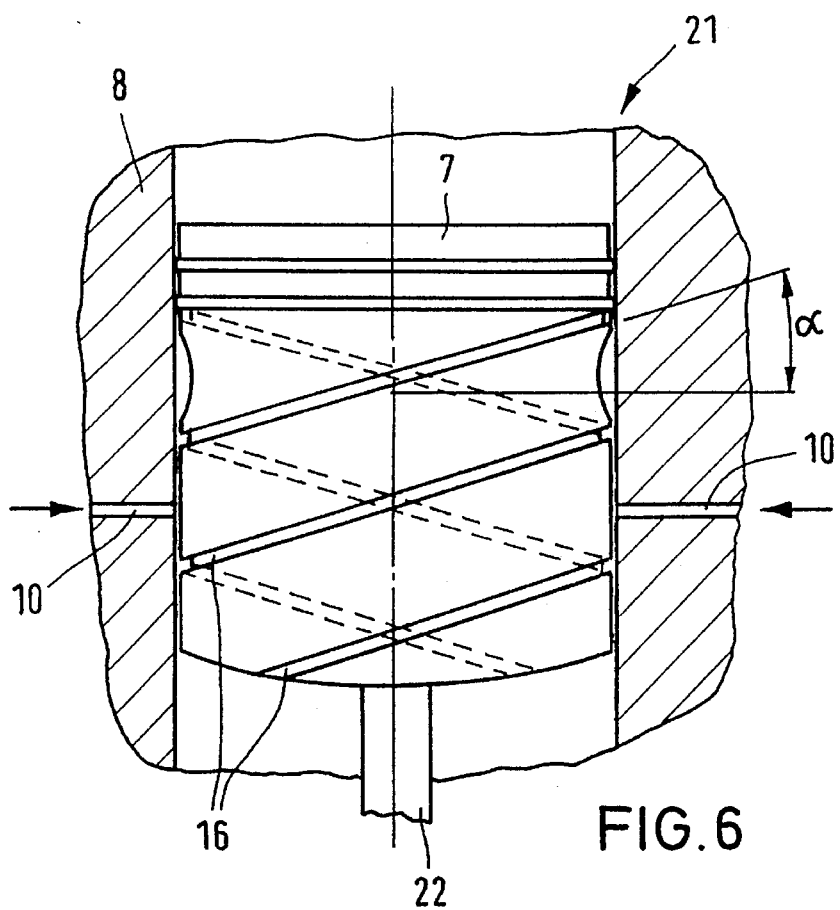
FIG. 6, another embodiment of the lubricant supply.

Another option for supplying lubricant to the running surfaces of the piston/cylinder tube unit 21 is shown in FIG. 6. Here the piston 7 has helical grooves 16 on its outer surface 25, as a result of which good distribution of the lubricant mixture and hence of the lubricant on the piston circumference is attained. In the exemplary embodiment shown in FIG. 6, the grooves end on the underside of the piston 7, and as a result the unhindered outflow of gaseous transport medium to the crankcase can be assured. The angle of inclination $\alpha$ of the helical groove 16 must be chosen to meet requirements. Provision may also be made so that one or more encompassing grooves are disposed on the outer surface of the piston 7 and cooperate with the supply bore 10. By this means as well, good distribution of the lubricant over the piston circumference can be brought about, and the gaseous transport medium can flow out through the gap 11 between the piston 7 and the cylinder wall 8. The grooves 16 suitably cooperate with the supply bore 10 in the bottom dead center position of the piston 7.

Figure 12:
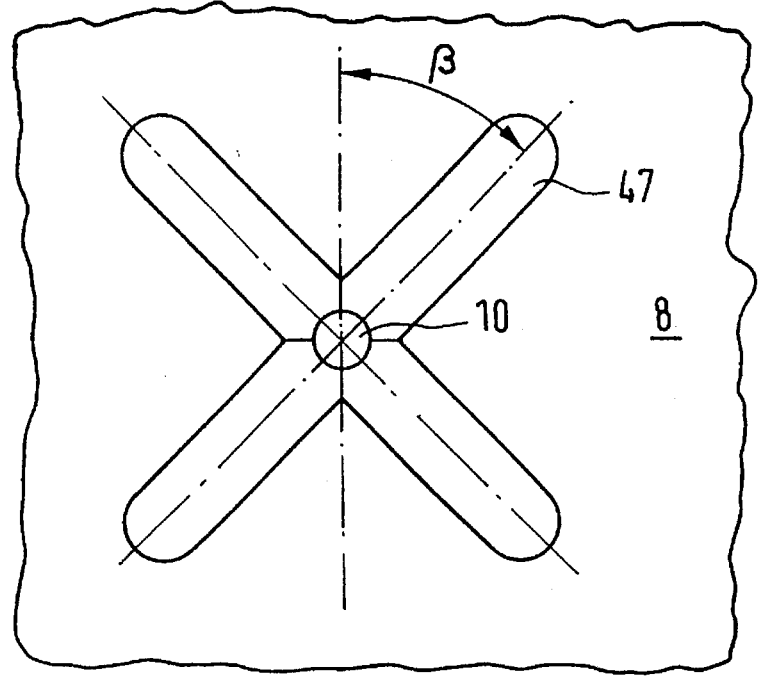
FIG. 12, the elevation view of one version of a groove in a cylinder wall or on the piston.
Figure 13:
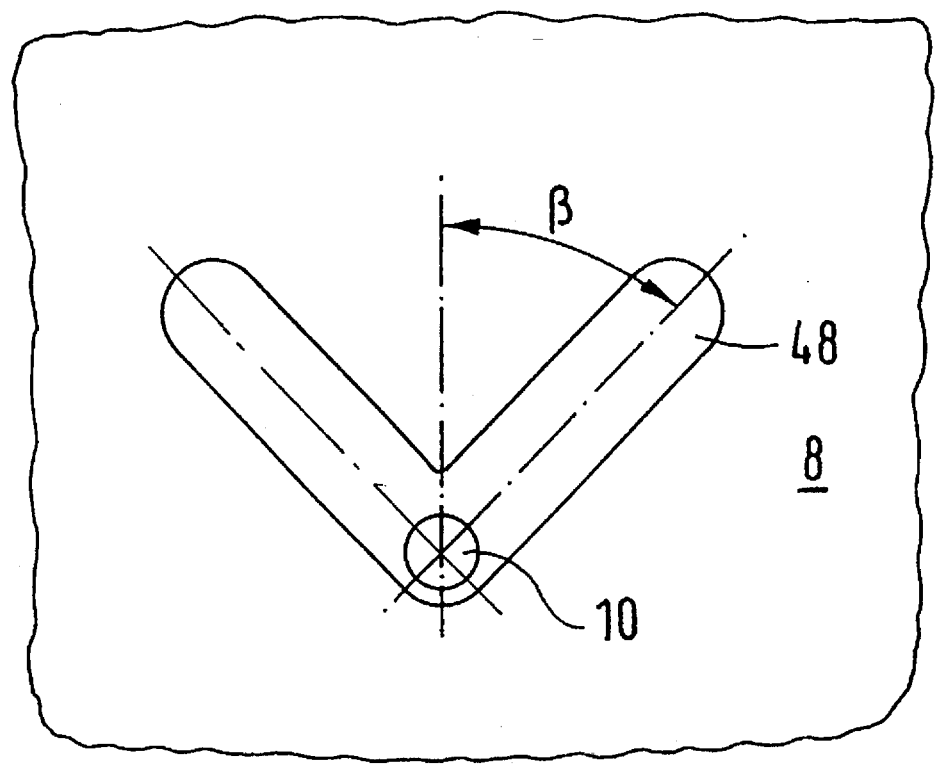
FIG. 13, the elevation view of a different version of a groove in the cylinder wall or on the piston.

Other embodiments of such grooves disposed on the outer surface 25 of the piston 7 and/or the inner surface 26 of the cylinder wall 8 are shown in FIGS. 12 and 13. The grooves 48, 47 may be V-shaped (FIG. 13) or X-shaped (FIG. 12). The angle of inclination $\beta$ of the groove axes relative to the cylinder axis may be approximately 45°, for instance. The advantage of this kind of groove arrangement in the cylinder tube is that the piston rings enter the groove and leave the groove at selected points. The groove also extends not as far in the circumferential direction as a horizontal groove would, so that the piston ring cannot plunge far into the groove. Provision can also be made for the grooves 16, 27, 47, 48 to have a cross-sectional dimension that is equal to or only slightly larger than the cross section of the supply bore 10.

Figure 7:
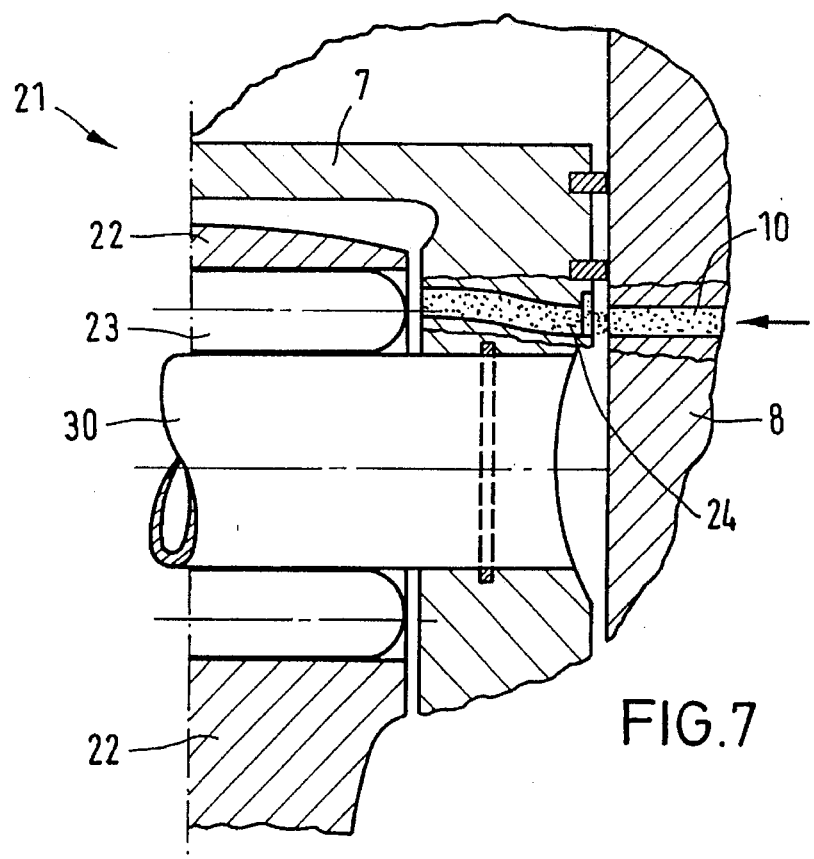
FIG. 7, in section, the lubricant supply for the upper connecting rod bearing.
Figure 8:
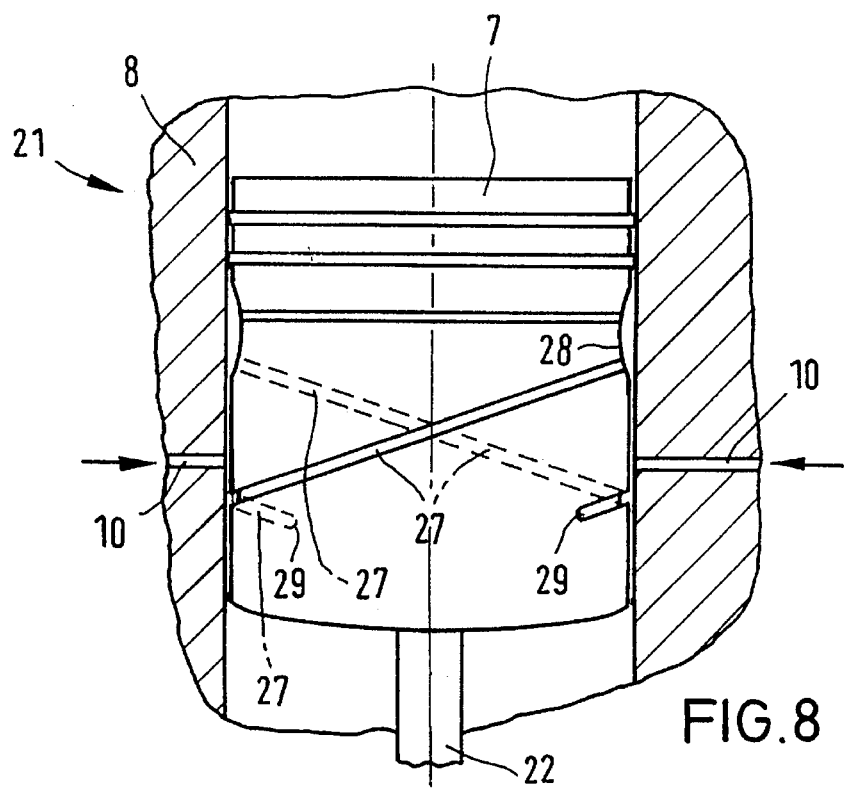
FIG. 8, another embodiment of the lubricant supply for the upper connecting rod bearing.

In FIGS. 7 and 8, options for supplying lubricant to the upper connecting rod bearing 23 are shown. In the exemplary embodiment shown in FIG. 7, the piston 7 has at least one essentially radially extending bore 24 in its upper region, which communicates at one end in the outer surface 25 of the piston 7. The mouth of the bore 24 is advantageously offset in the circumferential direction, for example at right angles to the piston pin 30. The other end of the bore 24 is aimed at the upper connecting rod bearing 23, which in the exemplary embodiment shown in the drawing is embodied as a roller bearing. The bore 24 cooperates with the supply bore 10 disposed in the cylinder wall 8. It is a practical feature that the supply of lubricant mixture to the bore 24 takes place in the bottom dead center position of the piston 7, because the piston 7 remains there for a relatively long period. It can also be practical for at least the mouth of the bore 24 on the outer surface 25 of the piston 7 to have a larger diameter than the supply bore 10, in order to assure that enough lubricant will be supplied to the upper connecting rod bearing 23. It can likewise be practical for the bore 24 to discharge into a groove extending parallel to the piston motion, so that the supply of lubricant over a certain portion of the motion of the piston 7 is assured. For the sake of simplicity, the drawing shows the bore 24 and the supply bore 10 offset circumferentially in the plane of the piston pin 30.

FIG. 8 shows another option for supplying the upper connecting rod bearing 23 with lubricant. In this embodiment, helical grooves 27 are disposed on the outer surface 25 of the piston 7. The grooves 27 end with one end at the piston pin boss 28. The other ends 29 of the grooves 27 terminate on the outer surface 25 of the piston 7, to prevent any possible outflow of lubricant mixture to the crankcase. By providing a suitable radial bore in the piston pin 30 it can be assured that the transport medium, which is at least partly still laden with liquid lubricant, will be carried to the upper connecting rod bearing 23. This amount of lubricant is adequate to lubricate to upper connecting rod bearing 23. In a practical way, the grooves 27 cooperate with the supply bore 10 in the bottom dead center position of the piston 7.

Figure 9:
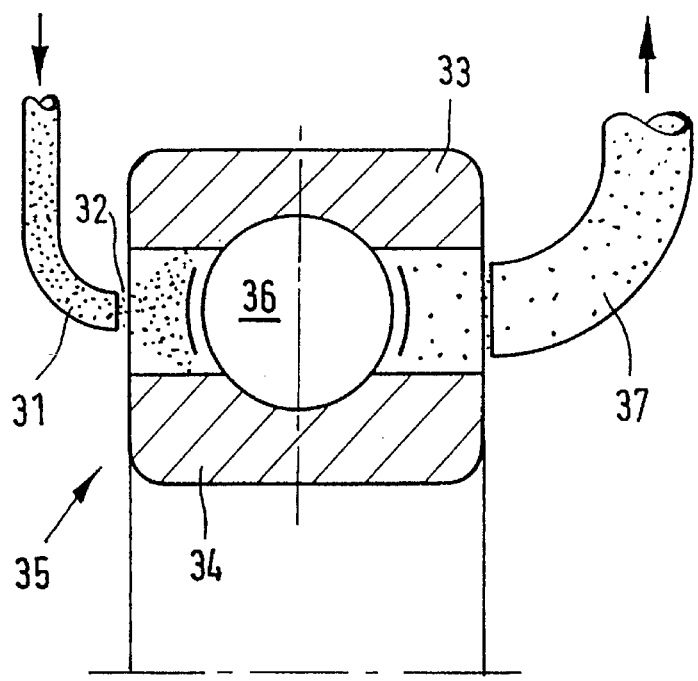
FIG. 9, in section, the lubricant supply for a roller bearing.

FIG. 9 illustrates the possibility of supplying lubricant to a roller bearing. Roller bearings are often used for the main crankshaft bearing and the crankshaft connecting rod bearing in two-stroke internal combustion engines. The arrangement for lubricant supply has a supply line 31, which ends with its outlet opening 32 in the region between the outer and inner race 33 and 34, respectively, of the roller bearing 35. The lubricant mixture, supplied under pressure, reaches the roller bodies 36. The lubricant that does not deposit there is caught via a suction line 37 disposed on the other side of the roller bearing 37. This assures that excess lubricant can be returned directly to the lubricant conditioning means, without first entering the crankcase, for instance.

Figure 10:
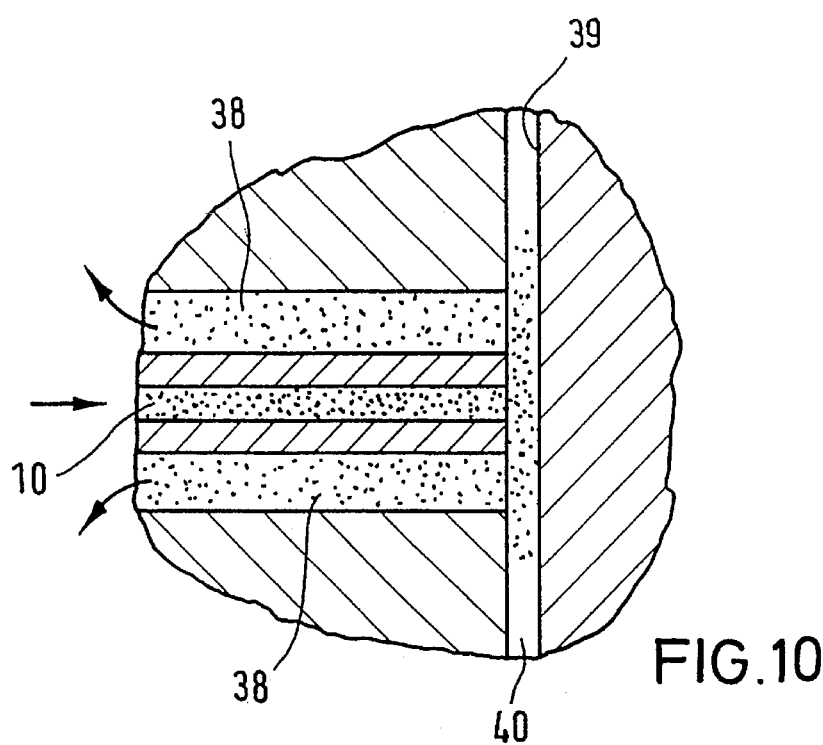
FIG. 10, in section, another embodiment of a lubricant supply to a gap to be lubricated.

Advantageously, the aspiration line is acted upon by negative pressure. Such aspiration lines can also be disposed for instance in the immediate vicinity of a supply bore 10 for the lubricant-containing transport medium. In FIG. 10, the supply bore 10 is disposed between two aspiration lines 38. When the lubricant mixture arrives at the surface 39, a certain proportion of the lubricant will be deposited there, while a certain portion will be deposited inside the lubrication gap 40 by means of the transport medium and moisten the surface 39 over a large area, while the excess amount of lubricant is carried away together with the gaseous transport medium through the aspiration lines 38. Once again it can be practical for the aspiration lines 38 to be acted upon by negative pressure. In addition to the provision of a plurality of separate aspiration lines, a concentric ring line may also be provided.

It is evident that with this lubrication system, a targeted lubricant supply with a simultaneously low consumption of lubricant is achieved. In particular, the critical points to be lubricated, namely the running surfaces of the piston/cylinder tube unit on the one hand and the upper connecting rod bearing on the other—for instance in an internal combustion engine—are supplied in a target way and adequately with lubricants. Moreover, the use of this lubrication system is also especially advantageous in two-stroke internal combustion engines with crankcase scavenging.

Figure 14:
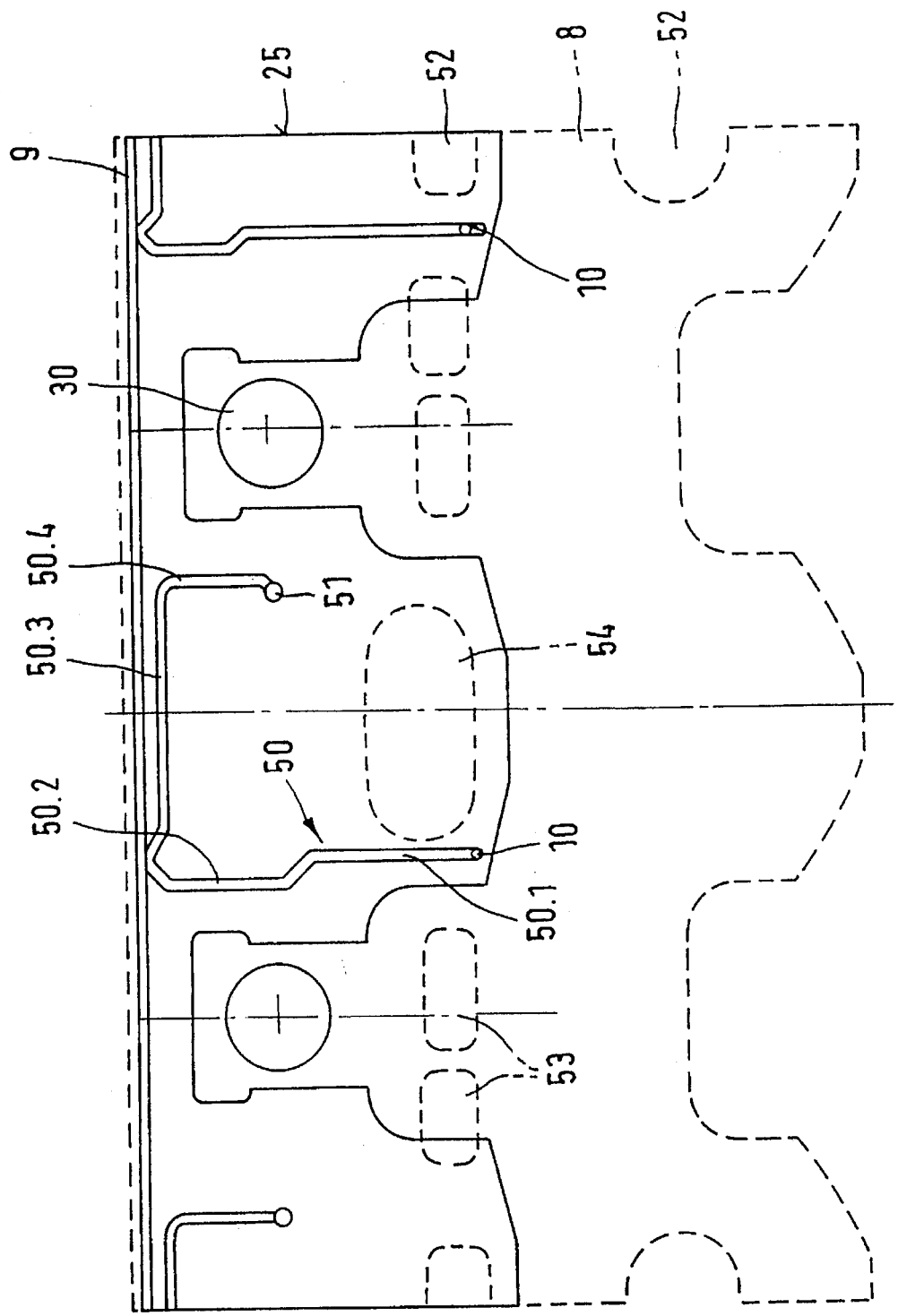
FIG. 14, another groove version, shown on a developed view of the outer piston surface, with the piston at top dead center and with the associated cylinder wall shown in suggested form.

FIG. 14 shows a further exemplary embodiment for the groove, in a developed view of the outer surface of the piston (solid line), specifically in its relationship with the associated cylinder wall face 8 (dashed lines), at top dead center for a two-stroke internal combustion engine. The location of the piston pin 30 is suggested with reference to the outer piston surface 25.

As the developed view of the outer piston surface 25 in FIG. 14 shows, one groove 50 is disposed on each of the two surface regions located between the piston pins; each groove essentially comprises an axial groove portion 50.1 beginning at the lower piston end, a groove portion 50.2 radially offset from it in the upper piston region, and an adjoining groove portion 50.3 extending circumferentially about the piston. Adjoining this then, the circumferentially extending groove portion 50.3 merges with a groove portion 50.4 that is again axially aligned with the lower piston end, and this portion is in turn adjoined by a through bore 51 by way of which the groove portion 50.4 communicates with the piston pin bearing.

Two diametrically opposed supply bores 10 are disposed in the cylinder wall 8; in the top dead center position of the piston shown in FIG. 14, they discharge into the axial groove portion 50.1, at its lower end. In this piston position, the gas inlet opening 52 disposed in the cylinder wall 8, the overflow openings 53, and the gas outlet opening 54 are all covered by the outer wall 25 of the piston. The lubricant mixture delivered via the supply bores 10 can flow via the groove 50 as far as the through bore 51 during the downward motion of the piston through the groove 50.

Figure 15:
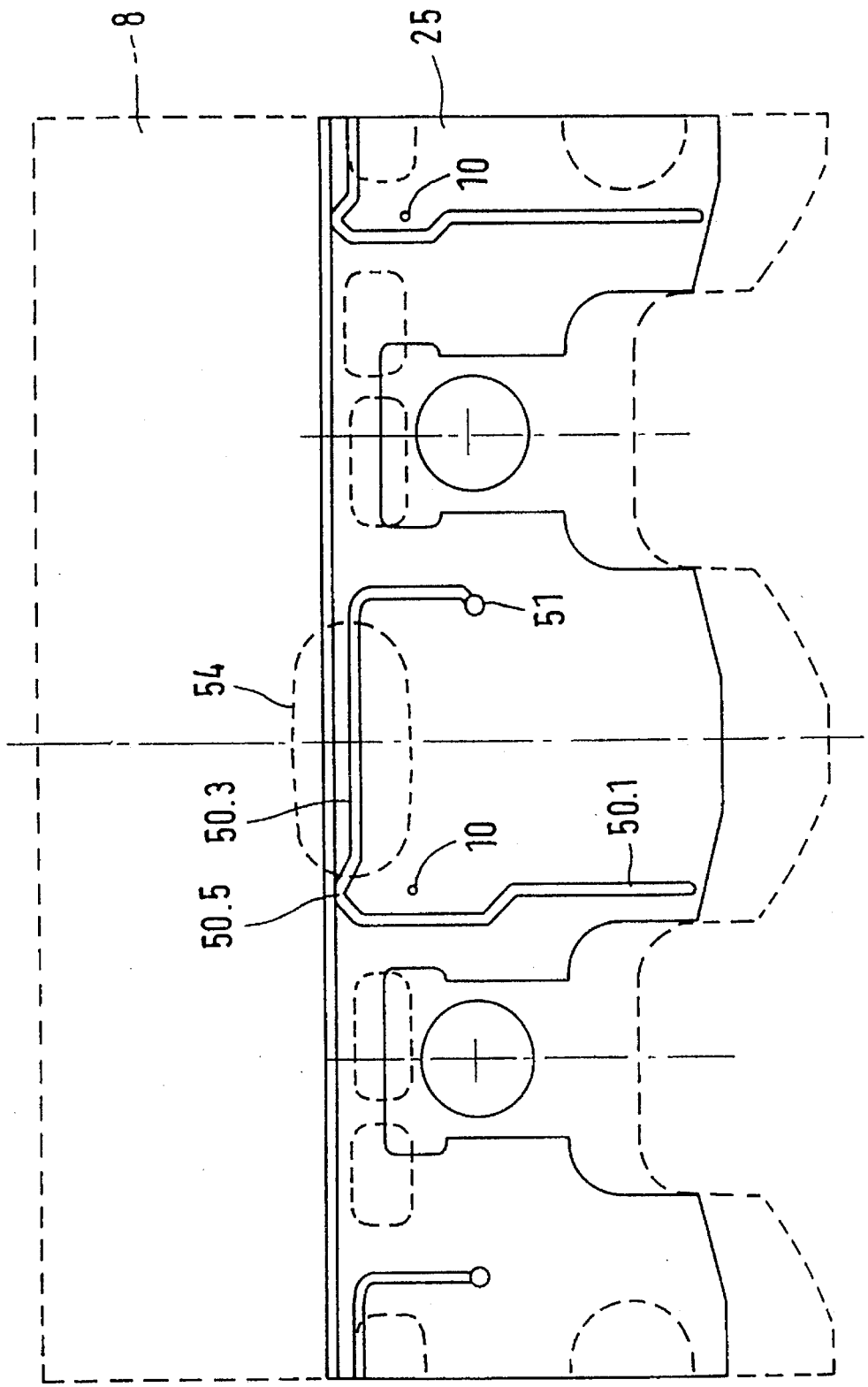
FIG. 15, the groove version of FIG. 14 in a middle piston position.

Now in order to reduce the escape of lubricant from the gas outlet 54 to a minimum, care is taken by means of the offset arrangement of the groove portion 50.2 relative to the groove portion 50.1 that when a middle piston position is reached, as shown in FIG. 15, the supply bores 10 are covered by the outer piston surface 25 over a portion of the piston stroke, so that during this phase the supply of lubricant to the groove 50 is interrupted. By means of a corresponding embodiment of the circumferentially extending groove portion 50.3, in the transition region between the upper, axially extending groove portion 50.2 and the groove portion 50.3, it can now be attained that once the bottom dead center position is reached, the transition region 50.5 will cover the supply bore for a brief period, so that lubricant mixture is briefly supplied in the region of the turning point. The circumferentially extending groove portion 50.3 is disposed with respect to the piston ring 9 such that the covering of the region 50.5 with the supply bore 10 does not occur until the circumferentially extending region 50.3 is located below where it coincides with the outlet conduit 54. As soon as the piston is again on its upward stroke, the supply bore 10 is quickly closed, and the supply of lubricant mixture is interrupted.

As FIG. 15 also shows, the upper, axially extending portion 50.2 of the groove 50 associated with the gas outlet conduit 54 may be embodied as somewhat longer than the corresponding region on the outer piston wall that is associated with the gas inlet conduits 52, so the gas outlet on that side the supply of lubricant mixture takes place over a somewhat longer period of time.

Figure 16:
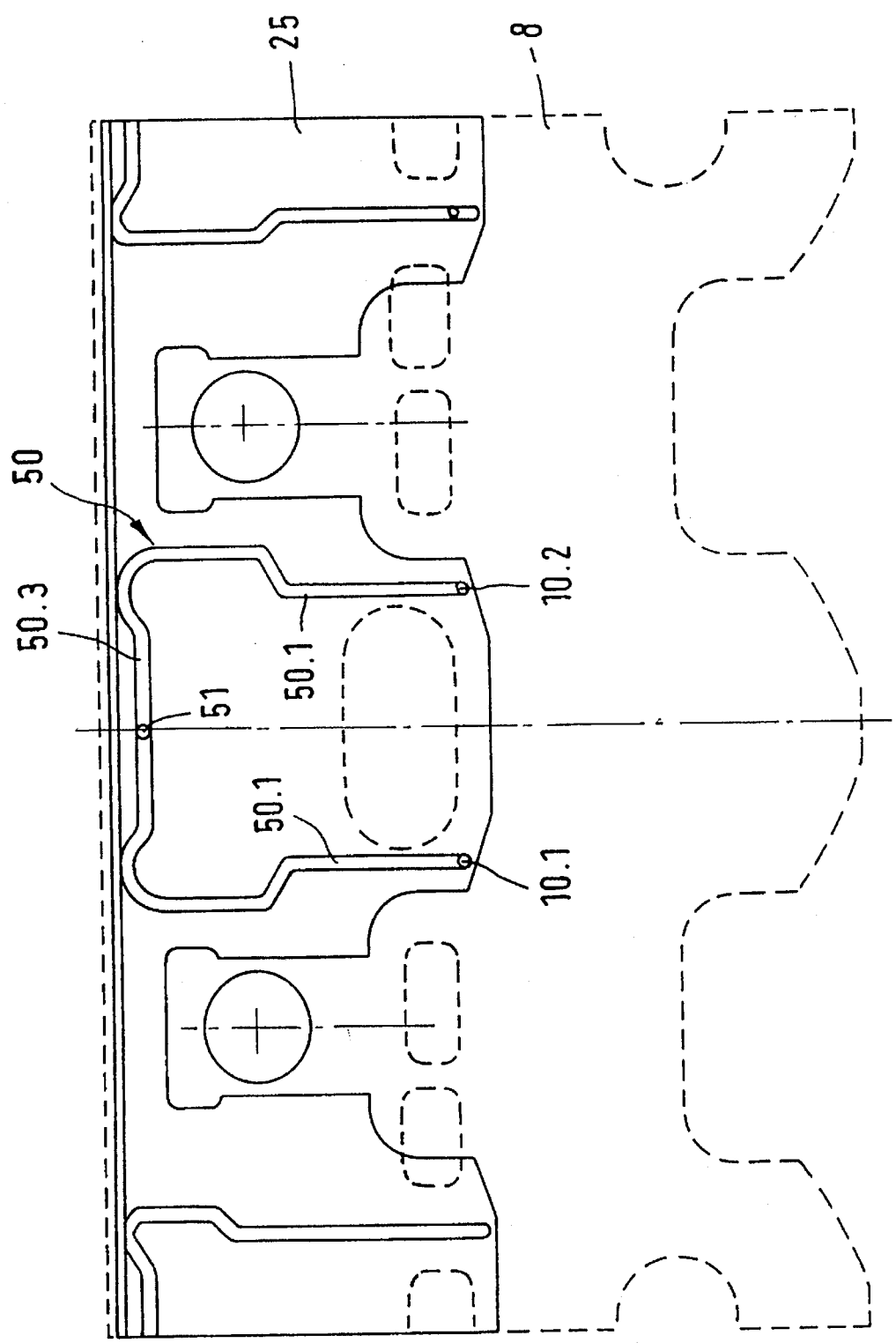
FIG. 16, a modification of the groove version of FIG. 14, with the piston at top dead center.
Figure 17:
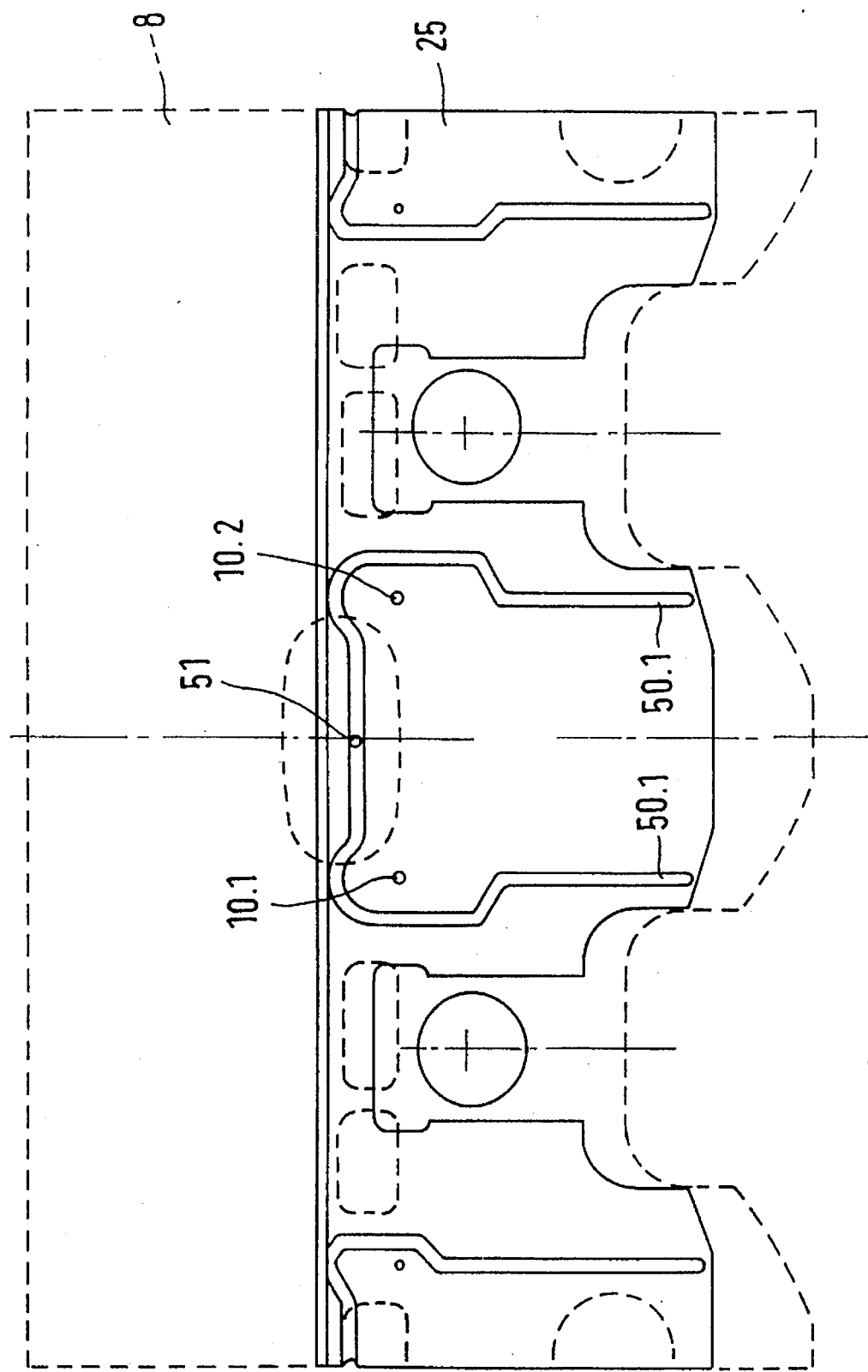
FIG. 17, the groove version of FIG. 16 in a middle piston position.

FIGS. 16 and 17, in a view corresponding to FIGS. 14 and 15, show a different embodiment for the groove 50. The structure and mode of operation are essentially equivalent to the embodiment of FIGS. 14 and 15. However, the difference is that the groove 50 is disposed essentially in a U on the outer piston surface 25, and that two supply bores 10.1 and 10.2 are provided per groove, each supply bore discharging in the lower end region of the axially extending groove portion 50.1. The through bore 51 that communicates with the interior of the piston preferably with the piston pin bearing, is disposed in this embodiment in the middle region of the circumferentially extending groove portion 50.3.

Figure 18:
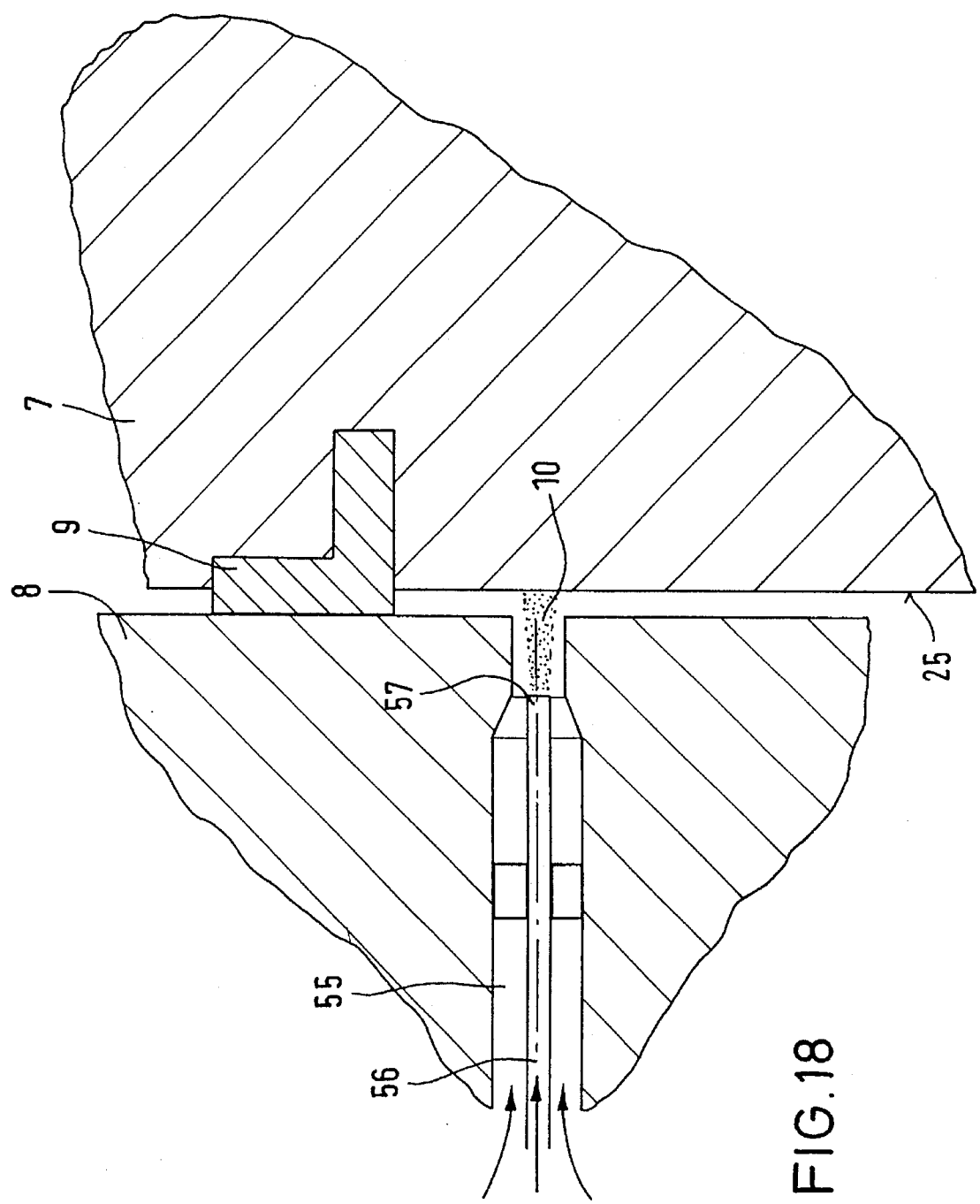
FIG. 18, an embodiment for producing and supplying the lubricant mixture.

FIG. 18, in an enlarged vertical section, shows an embodiment for the formation and delivery of the lubricant mixture immediately in the region of the cylinder. Here the supply opening 10 in the cylinder wall 8 communicates with an inlet conduit 55 for supplying a gaseous carrier medium, which communicates via corresponding inlet lines with a supply means. The inlet conduit 55 has a larger diameter than the supply opening 10. Introduced into this inlet conduit 55, preferably coaxially, is an inlet tube 56 whose outlet opening 57 discharges in the region of the inlet conduit 55 in which the diameter of the inlet conduit 55 decreases the diameter of the supply opening 10. The inlet line 56 also communicates with a suitable lubricant supply. As a result, it is attained that by means of the gaseous carrier medium flowing in via the inlet conduit 55, the lubricant emerging from the outlet opening 57 can flow into the interstice defined by the grooves 50 between the cylinder wall 8 and the outer piston surface 25.

Figure 19:
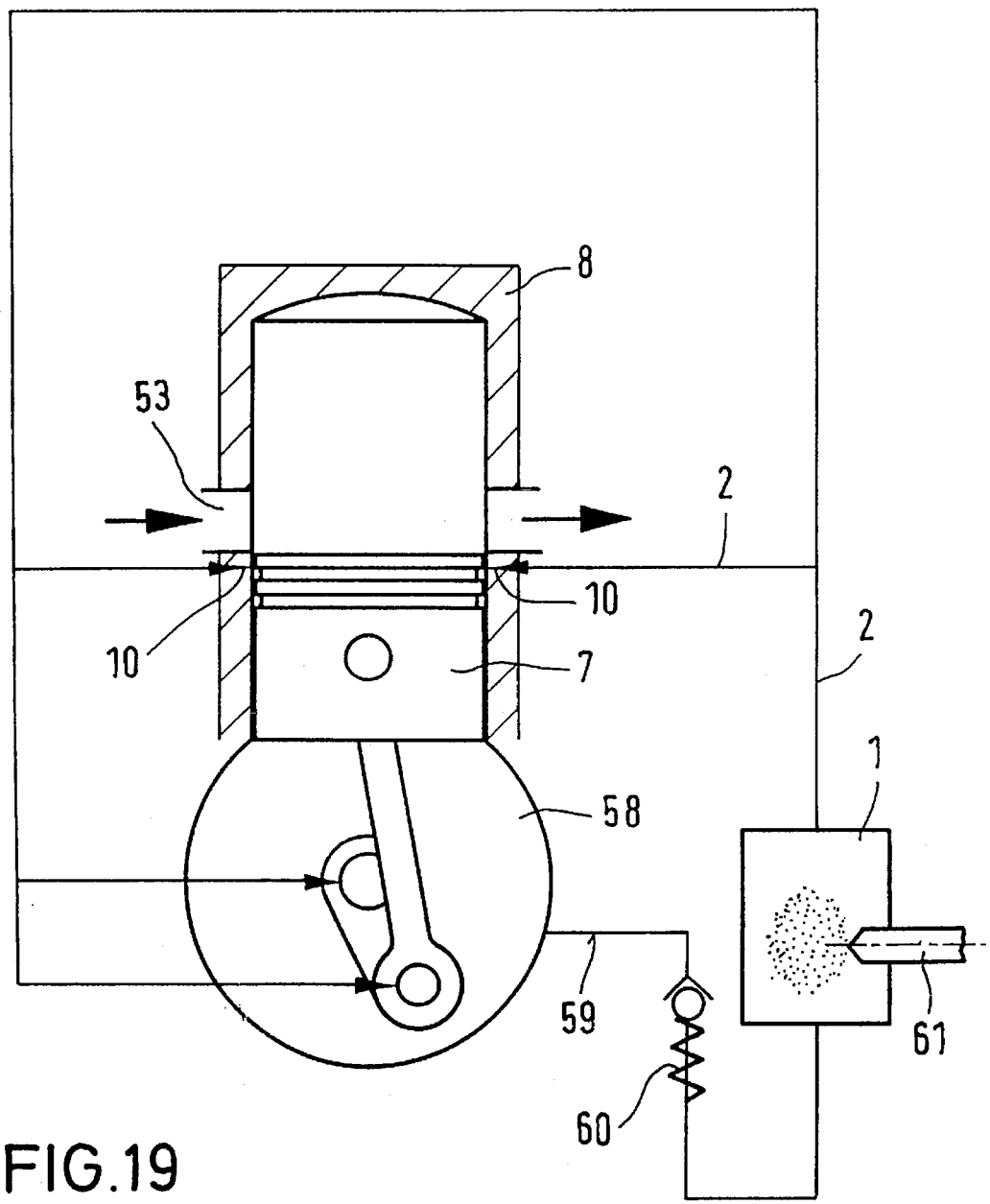
FIG. 19, a schematic illustration of a lubricant supply for a two-stroke internal combustion engine.

FIG. 19 schematically shows a two-stroke internal combustion engine, whose cylinder 8 is provided with an overflow conduit 53 and an outlet conduit 54 and which is embodied as a so-called crankcase-scavenged engine. This engine compresses the air in the crankcase 58 in the downward motion of the piston 7. The compressed air can then flow into the combustion chamber, at the moment the overflow conduits open, and is further compressed in the combustion chamber. The fuel is then injected and ignited in the usual way via a spark plug, so that the piston 7 can execute its working stroke in the downward motion. At the end of the working stroke the outlet conduit 54 is uncovered, so that the combusted exhaust gases are scavenged from the cylinder chamber by the inflowing fresh air.

During the downward motion of the piston 7, an excess pressure is created in the crankcase 58; this pressure reaches its maximum at the instant the overflow conduits open. This pressure pulsation in the crankcase can now be exploited in order to feed air from the crankcase into a conditioning device 1, via an air line 59 in which a check valve 60 is disposed; the air is then carried over suitable transport lines 2, as already shown in FIG. 1, to the supply openings 10 for the lubricant mixture. During the upward motion of the piston 7, a negative pressure for aspirating the fresh air is created in the crankcase 58. In this phase, a transport of the air then takes place through the transport lines 2 to the various supply openings 10. By way of this air, as shown in FIG. 18, the lubricant supplied via separate inlet lines 56 can be atomized immediately before being introduced into the cylinders.

In the embodiment shown here, it is also possible, however, to embody the conditioning device 1 as a container, in which the lubricant is atomized via an atomizer 61, so that an oil-air mixture is carried from this container through the transport lines 2 to the supply openings 10. As shown in FIG. 1 and described in conjunction with it, the transport lines 2 can also be extended as far as the crankshaft bearing and the connecting rod bearing, so that these bearings are jointly lubricated as well.

We claim:

1. A process for supplying a liquid lubricant to points of a reciprocating piston engine which are to be lubricated and which include at least running surfaces of a piston-cylinder tube unit of the reciprocating piston engine, the reciprocating piston engine having a piston and a cylinder, the process comprising the steps of:

uniting the lubricant in at least one conditioning device with a gaseous transport medium;

forming, in the conditioning device, a lubricating mixture including small liquid particles of lubricant carried by the gaseous transport medium;

passing at least one of the lubricating mixture and the lubricant with the gaseous transport medium through a plurality of supply ducts corresponding to the points to be lubricated; and drawing away, through at least one drain disposed in a region of the points to be lubricated, the gaseous transport medium and excess lubricant from the points to be lubricated.

2. The process according to claim 1, wherein the step of passing includes the step of dosing the lubricating mixture for the respective ones of the points to be lubricated by effecting various flow resistances in the supply ducts corresponding thereto, the various flow resistances corresponding to predetermined doses of the lubricating mixture.

3. The process according to claim 2, wherein the step of effecting various flow resistances includes the step of selecting one of various cross-sectional dimensions and various cross-sectional geometries of respective outlet openings of the supply ducts.

4. The process according to claim 1, wherein the step of passing includes the step of supplying lubricating mixture to the points to be lubricated virtually continuously.

5. The process according to claim 1, wherein the step of passing includes the step of dosing the lubricating mixture for the respective ones of the points to be lubricated by varying, between the supply ducts, one of a volumetric flow of the transport medium and a concentration of the lubricant in the transport medium.

6. The process according to claim 1, wherein the step of passing includes the step of dosing the lubricating mixture for the respective ones of the points to be lubricated as a function of one of a load and rpm of the reciprocating piston engine.

7. The process according to claim 1, wherein the step of passing includes the step of supplying lubricating mixture to an upper connecting rod bearing of the piston through at least one bore in the piston which cooperates with a supply bore in a wall of the cylinder.

8. The process according to claim 1, wherein:

the step of passing includes the step of supplying lubricating mixture to the piston through a groove extending on an outer surface of the piston; and the step of drawing away includes the step of supplying lubricating mixture to an upper connecting rod bearing of the piston by discharging lubricating mixture supplied to the piston through at least one end of a piston pin boss of the piston through bores in a corresponding piston pin of the piston disposed in a region of the upper connecting rod bearing.

9. The process according to claim 1, wherein:

at least one of the points to be lubricated is a surface to be lubricated onto which a corresponding supply duct discharges; and the step of passing includes the step of supplying lubricating mixture as a lubricating wall film on the surface to be lubricated.

10. The process according to claim 1, wherein the step of passing includes the step of transporting the lubricant as a wall film in the supply duct.

11. The process according to claim 1, wherein the step of passing includes the step of supplying the lubricating mixture to the points to be lubricated at excess pressure.

12. The process according to claim 1, wherein the step of drawing away includes the step of subjecting the drains to negative pressure.

13. An assembly comprising:

a reciprocating piston engine including a piston cylinder tube unit having:

a cylinder including a cylinder wall, the cylinder wall having therein at least one supply bore for supplying lubricant as small liquid particles carried in a gaseous transport medium to points of the piston cylinder tube unit to be lubricated;

a piston having an outermost surface, an interior region, a piston bearing disposed in the interior region, an uppermost piston ring and a lowermost piston ring, the piston rings being disposed in a circumferential direction about the outermost surface of the piston, the piston being disposed in the cylinder such that it defines an interstice between its outermost surface and the cylinder wall and further being adapted to move axially between a bottom dead center position and a top dead center position, the supply bore in the cylinder wall being disposed such that it discharges lubricant into the interstice and below the uppermost piston ring when the piston is in its bottom dead center position, the outermost surface of the piston further including:

at least one groove having:

at least one axial groove portion extending, at a region beginning at a lower end of the piston, essentially in an axial direction of the piston, the axial groove further including:

a bottom end disposed at the lower end of the piston such that the supply bore discharges lubricant into the bottom end when the piston is at its bottom dead center position;

a lower end portion extending axially upward from the bottom end; and an upper end portion adjoining and circumferentially offset with respect to the lower end portion such that, during a downward axial movement of the piston before bottom dead center is reached, the supply bore does not communicate with the upper end portion and is covered by the outermost surface of the piston over a predetermined range of the axial movement of the piston;

a circumferential groove portion adjoining the axial groove portion and extending in the circumferential direction of the piston below the lowermost piston ring; and a transition groove portion disposed between and adjoining both the upper end portion and the circumferential groove portion; and a draining means for draining the lubricant away from the points of the piston cylinder tube unit to be lubricated, the draining means including a venting bore communicating with the circumferential groove portion and discharging lubricant into the piston bearing disposed in the interior region of the piston; and a means for supplying liquid lubricant to the reciprocating piston engine, the means being operatively connected to the reciprocating piston engine and including means for transporting the liquid lubricant to the supply bore of the piston cylinder tube unit.

14. The assembly according to claim 13, wherein the transition groove portion is disposed on the outermost surface of the piston such that the supply bore discharges lubricant therein when the piston is at its bottom dead center position.

15. The assembly according to claim 13, wherein:

the at least one axial groove portion includes two axial groove portions disposed on the outermost surface of the piston and adjoined by the circumferential groove portion such that the at least one groove is essentially U-shaped; and the at least one supply bore includes two supply bores discharging into the bottom end of each of the two axial groove portions, respectively.

16. The assembly according to claim 13, wherein:

the reciprocating piston engine is a two-stroke internal combustion engine;

the cylinder wall includes an inlet slit and an outlet slit spaced with respect to one another in a circumferential direction; and the supply bores are disposed between the inlet slit and the outlet slit such that they are below the uppermost piston ring when the piston is in its bottom dead center position.

17. The assembly according to claim 13, wherein:

the piston bearing includes an upper connecting rod bearing;

the piston further includes:

a piston pin boss disposed adjacent the upper connecting rod bearing;

a piston pin disposed in the piston pin boss and having at least one bore extending therein is a radial direction with respect to the piston and communicating with the upper connecting rod bearing; and the at least one groove discharges into the at least one bore extending through the piston pin for supplying lubricant to the upper connecting rod bearing.

18. The assembly according to claim 13, wherein:

the piston bearing includes an upper connecting rod bearing; and the piston further includes at least one bore therein communicating with the upper connecting rod bearing and extending from the outermost surface of the piston such that it communicates with the supply bore at a predetermined axial position of the piston.

19. The assembly according to claim 13, wherein the supply bore is adapted to carry liquid lubricant therein as a wall film of lubricant on walls thereof, the wall film being entrained by the gaseous transport medium flowing through the supply bore, the supply bore further including a cross-sectional constriction therein disposed immediately upstream of the points to be lubricated, the constriction being configured such that a wall film of lubricant develops on the cylinder wall when the supply bore discharges lubricant thereto.

20. The assembly according to claim 13, wherein the cylinder wall further includes:
 a first supply line for the gaseous transport medium, the first supply line communicating with the supply bore; and
 a second supply line for the liquid lubricant, the second supply line discharging into the first supply line at a distance upstream of the supply bore.

21. The assembly according to claim 13, wherein the supply bore includes a cross-sectional constriction therein disposed immediately upstream of the points to be lubricated, the constriction being adapted to deflect a flow of small liquid particles of lubricant carried by the gaseous transport medium.

22. The assembly according to claim 13, wherein:
 the piston has a compression side and a counterpressure side; and
 the supply bore is disposed on at least one of the compression side and the counterpressure side of the piston.

23. The assembly according to claim 21, wherein the constriction consists of a porous body adapted to deflect the flow of the small liquid particles such that the particles grow in size inside the constriction.

* * * * *

UNITED STATES PATENT AND TRADEMARK OFFICE
CERTIFICATE OF CORRECTION

PATENT NO. : 5,588,504
DATED      : December 31, 1996
INVENTOR(S) : Leo Spiegel et al It is certified that error appears in the above-indentified patent and that said Letters Patent is hereby corrected as shown below:

On the title page, item [73], the name of the assignee should read --FEV Motorentechnik GmbH & Co. Kommanditgesellschaft--.

Signed and Sealed this

Sixth Day of May, 1997

*Attest:*

BRUCE LEHMAN

*Attesting Officer*  *Commissioner of Patents and Trademarks*